United States Patent [19]

Barton

[11] 4,436,324
[45] Mar. 13, 1984

[54] BRIDGE BIDDING AID

[76] Inventor: Lyndon O. Barton, 26 Shull Dr., Newark, Del. 19711

[21] Appl. No.: 290,310

[22] Filed: Aug. 5, 1981

[51] Int. Cl.³ .................. G09B 19/22; A63F 3/00
[52] U.S. Cl. .................................. 283/50; 273/285; 434/129
[58] Field of Search .............. 434/128, 129; 283/1 R, 283/49, 50; 273/284, 285, 286, 287, 148 R

[56] References Cited

U.S. PATENT DOCUMENTS

| | | | |
|---|---|---|---|
| 343,496 | 6/1886 | Seliger | 273/284 |
| 1,699,132 | 1/1929 | Buchanan | 273/285 |
| 2,025,966 | 12/1935 | Williams | 434/129 |
| 2,038,734 | 4/1936 | Hardy | 434/129 |
| 2,199,497 | 5/1940 | Jondreau | 434/129 |
| 3,731,399 | 5/1973 | Gordy et al. | 434/129 |
| 3,863,362 | 2/1975 | Borianne | 434/129 |
| 4,190,253 | 2/1980 | Andrae | 434/129 X |

Primary Examiner—E. R. Kazenske
Assistant Examiner—John S. Brown

[57] ABSTRACT

A bridge bidding aid is designed in the form of a booklet having an oversized cover and a plurality of instruction pages that correspond to various opening bids. The booklet is devised such that, when unfolded at the center of a bridge table, the four players can simultaneously and independently consult the notes to decide on their bids. Also, the information is programmed such that when the opening bidder's notes face the opening bidder, the notes pertaining only to responding bids will face the responder and, similarly, the notes for opponent overcalls and responses will be appropriately positioned in front of the opponents.

4 Claims, 1 Drawing Figure

BRIDGE BIDDING AID

BACKGROUND OF INVENTION

The successful bidding of bridge hands is extremely difficult for beginning bridge players to learn and master and continues to pose a challenge for even more experienced players. This is particularly true of the U.S. point count system where players are required to evaluate their hands by calculating the total points in their hands and to make a number of possible opening or responding bids according to a specific point total or point range.

Other considerations that further complicate the bidding process are (a) whether a hand is balanced or unbalanced, (b) whether certain suits are much stronger than others, and (c) the level at which the bid must be made.

Because of these complexities, the bridge bidding aid has been devised with specific objectives as follows:

To provide a convenient and effective means whereby a beginning bridge player can quickly evaluate a hand and make the appropriate opening, overcall or responding bid based on the U.S. point count system.

To provide a single reference device that players around a bridge table can independently and simultaneously consult without having to tax their memories, or depend on a supervising instructor.

To provide a device that players will find extremely simple to use, and

To provide a device that is easy to manufacture.

OPERATION

To make use of the booklet, players first take turn to consult the notes, after the hands have been dealt, in order to determine the opening bid. Once the opening bid is made, the booklet is placed unfolded at the center of the table, with the opening bidder's notes facing the opening bidder. This automatically orients the responder's notes toward the responder and the opponents' notes toward the opponents. In this way, players around the table can independently and yet simultaneously consult the booklet for their appropriate bids, without the need to change the position of the booklet, once the auction has begun. After the auction is completed, the booklet can be closed and set aside.

FIGURE

FIG. 1 shows the BRIDGE BIDDING AID in its unfolded position.

DESCRIPTION OF PREFERRED EMBODIMENT

Figure 1:
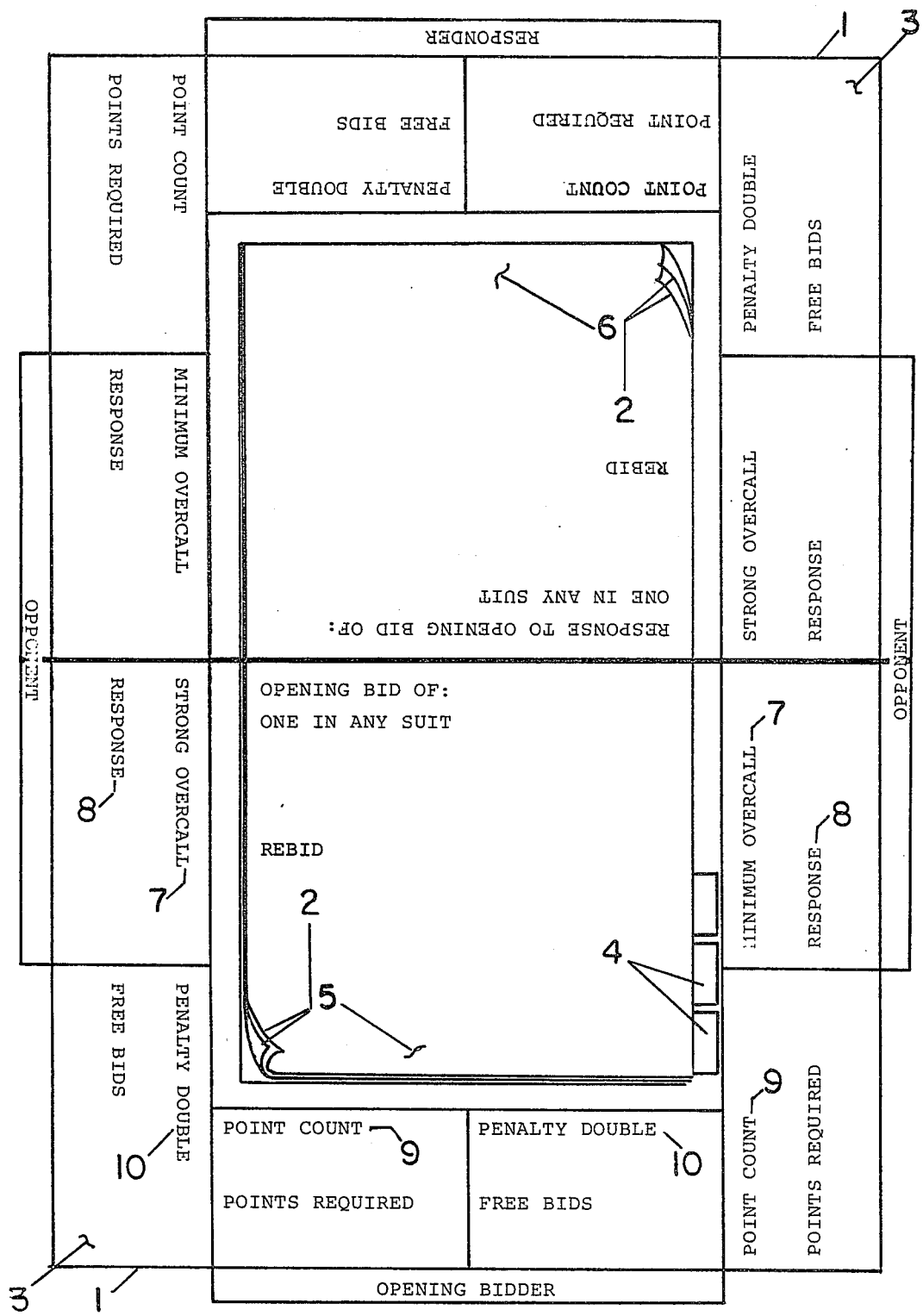

The booklet 1 in FIG. 1 is comprised of a plurality of sheets 2 and an oversized cover 3, permanently secured to a spine in such a way that when unfolded and laid on a level surface, said sheets 2 will also lay flat and thus assume a stable position. The sheets 2 are equipped with tabs 4 to provide an index to the various pages that contain notes 5 and 6, pertaining to various bidding sequences or opening bids such as, ONE IN A SUIT, ONE NO TRUMP, TWO IN A SUIT, etc. The notes 5 and 6 are arranged such that those 5 pertaining to opening bids and subsequent rebids are typically on one page, and those 6 pertaining to partner responses are typically on the opposite page. Also, arrangement of said notes, 5 and 6, is such that when the booklet is unfolded, said notes 5 for opening bids directly face, and are readable only by the opening bidder, said notes 6 for responding bids will directly face and are readable only by the responder.

Notes 5 for opening bids normally contain the requirements for such bids, and subsequent rebids depending on the responses given by the partner. Similarly, notes 6 for responding bids contain requirements for such responses depending on the open-bids and subsequent rebids by the opening bidder.

The oversized cover 3 has a portion extending beyond the sheets 2 such that, when the booklet 1 is unfolded, the extended portion forms a border around the sheets. The extended portion also contain notes 7 and 8 pertaining to opponents' overcalls and related responses as well as some general information considered useful to all of the players, such as POINT COUNT and PENALTY DOUBLE requirements 9 and 10. The notes are, so positioned that those, 7 and 8, relating to the opponents' overcalls and responses directly face, and are readable only by the opponents while the general notes 9 and 10 face, and, are readable by, each player. The booklet 1 is also arranged such that when unfolded, the notes facing each player are in immediate proximity to each player.

It should be noted that one important advantage of the booklet format devices is that it allows for variation in the bidding sequences depending on the bidding system players choose to adopt. Also, the number of sheets 2 (or pages) is limited only by the number of bidding sequences a particular system allows. This embodiment takes into consideration the Standard American System and five bidding sequences namely, ONE IN A SUIT, TWO IN A SUIT, THREE IN A SUIT, ONE NO TRUMP and TWO NO TRUMP. Another advantage of the booklet format is that it selects only the pertinent information that the player needs for reference, when required to fulfill a particular role such as the opening bidder, the responder, or an opponent. Thus, the player can readily review what specific options exist for the bid, without having to deal with extraneous information that do not pertain to his or her immediate situation.

The booklet 1 can be constructed from ordinary paper material, plastic, or fabric, and color coded to obtain the best effect. While the above description is considered to be a preferred embodiment of the present invention, it will be obvious to those skilled in the art that various changes and modifications may be made therein without departing from the intent and scope of the invention.

What I claim is:

1. A booklet having an oversized cover and a plurality of sheets, devised to aid bridge players in bidding situations, wherein
   a. said sheets and said cover are permanently secured to a spine, and contain notes so arranged that, when said booklet is unfolded, four players seated around a table can simultaneously and independently consult said notes to decide on their respective bids,
   b. said oversized cover has a portion extending beyond said sheets such that when said booklet is unfolded, said extended portion forms a border around said sheets,
   c. said notes contained on said sheets are so arranged that, when said booklet is unfolded, the notes relating to the opening bidding sequence are positioned typically on one page and face, or are readable only by, the opening bidder, while the notes relating to the response bidding sequence are positioned typically on the opposite page and face, or are readable only by, the responder, d. said notes contained on said cover are recorded on said extended portion and arranged such that, when said booklet is unfolded, they directly face each player, e. said notes on said sheets and said cover facing each player are in immediate proximity to each player, f. said booklet when unfolded and placed on a level surface will permit said sheets to be maintained in a flat and stable position.

2. Said booklet in claim 1 is adaptable to the standard American bridge bidding system.

3. Said booklet in claim 1 is adaptable to other card games where a structured bidding system exists.

4. Said booklet in claim 1 contains indexed sheets to permit ready access to any one of the bidding sequences which it contains.

* * * * *